(12) United States Patent
Luo et al.

(10) Patent No.: US 12,445,760 B2
(45) Date of Patent: Oct. 14, 2025

(54) BACKPACK MICROPHONE STAND AND RECORDING SYSTEM

(71) Applicant: TILTA INC., Burbank, CA (US)

(72) Inventors: Yaolong Luo, Shenzhen (CN); Wenping Zeng, Shenzhen (CN); Kefeng Zhou, Shenzhen (CN); Jared Cohn, Los Angeles, CA (US)

(73) Assignee: TILTA INC., Burbank, CA (US)

( * ) Notice: Subject to any disclaimer, the term of this patent is extended or adjusted under 35 U.S.C. 154(b) by 193 days.

(21) Appl. No.: 18/227,592

(22) Filed: Jul. 28, 2023

(65) Prior Publication Data

US 2024/0406606 A1    Dec. 5, 2024

(30) Foreign Application Priority Data

Jun. 1, 2023   (CN) .......................... 202321380573.2

(51) Int. Cl.
*A45F 3/04* (2006.01)
*H04R 1/02* (2006.01)
*H04R 1/08* (2006.01)
*A45F 3/00* (2006.01)

(52) U.S. Cl.
CPC ................. *H04R 1/08* (2013.01); *A45F 3/04* (2013.01); *H04R 1/025* (2013.01); *A45F 2003/003* (2013.01)

(58) Field of Classification Search
CPC ...... A45F 2003/003; H04R 1/08; F16M 13/04
USPC .......................... 224/185, 270; 381/362, 364
See application file for complete search history.

(56) References Cited

U.S. PATENT DOCUMENTS

| | | | | |
|---|---|---|---|---|
| 2,421,437 | A | * | 6/1947 | Ryan ....................... F16M 11/28 381/362 |
| 5,454,042 | A | * | 9/1995 | Drever ................... F16M 11/10 381/361 |
| 6,450,377 | B1 | * | 9/2002 | Oriolo .................... F16M 13/00 381/361 |
| 10,327,536 | B2 | * | 6/2019 | Pruess ................. H01M 50/247 |
| 10,856,062 | B1 | * | 12/2020 | Cohn ................. F16M 11/2021 |
| 2008/0304687 | A1 | * | 12/2008 | Howell ..................... H04R 1/08 381/362 |
| 2024/0048884 | A1 | * | 2/2024 | Teichman ................ H04R 1/08 |

(Continued)

FOREIGN PATENT DOCUMENTS

| | | | |
|---|---|---|---|
| CN | 208386858 U | 1/2019 | |
| WO | WO-9717569 A1 * | 5/1997 | ........... F16M 11/048 |
| WO | WO-0175353 A1 * | 10/2001 | ............. F16M 11/10 |

*Primary Examiner* — Scott T Mcnurlen
(74) *Attorney, Agent, or Firm* — LOZA & LOZA, LLP; Derek Yeung

(57) ABSTRACT

The present disclosure belongs to the field of microphone equipment, in particular to a backpack microphone stand. The backpack microphone stand includes a support rod, an adjustment system, a backpack mechanism, and a support component for the support rod. The support rod is provided with a mounting position of a microphone, one end of the support component is movably connected with the support rod and the other end is movably connected with the backpack mechanism. The adjustment system is movably connected with the support rod to adjust the pitch angle of the support rod. With the disclosed backpack microphone stand, the effort or force needed to operate the equipment is greatly reduced. Therefore the operator's hands and arms will suffer less fatigue, and injury to the wrists can be effectively reduced.

10 Claims, 11 Drawing Sheets

(56) References Cited

U.S. PATENT DOCUMENTS

2024/0406607 A1* 12/2024 Luo .................... F16M 11/2064
2024/0406608 A1* 12/2024 Luo .................... F16M 11/2028

* cited by examiner

BACKPACK MICROPHONE STAND AND RECORDING SYSTEM

CROSS-REFERENCE TO RELATED APPLICATIONS

The present Application for Patent claims priority to and the benefit of pending Chinese Utility Model application No. 202321380573.2 filed Jun. 1, 2023, and hereby expressly incorporated by reference herein as if fully set forth below in its entirety and for all applicable purposes.

TECHNICAL FIELD

The present disclosure relates to the field of microphone equipment, in particular to a backpack microphone stand and recording system.

INTRODUCTION

In typical filming setups, operators often hold a support rod with a recording microphone, a common device used for shooting, attached to stay close to the target, causing discomfort and fatigue during long-duration shoots or filming. For example, a recording microphone for broadcasting and television (e.g., Chinese patent application number: CN201821297949.2) may include a support rod, wherein one end is movably connected with a telescopic rod, one end of the telescopic rod away from the support rod is movably connected with a rotary connection port while the other end is inserted into the support rod. The interior of the rotary connection port is fixedly connected with a connecting shaft, its outer surface is sleeved with a movable rod fixing clamp with screws provided on the front. The microphone is subject to various limitations and drawbacks known in the existing art.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

In order to solve the above problem, the present disclosure provides a backpack microphone stand that allows for easy operator use and convenient adjustment of the microphone angle of a microphone mounted on the microphone stand.

Additionally, the present disclosure provides a recording system that is easy to use and facilitates simple and convenient microphone angle adjustment.

In some aspects, the backpack microphone stand includes a support rod, an adjustment system, and a supporting component, wherein the supporting component, along with the adjustment mechanism, enables the operator to support the support rod, allowing rotational movement at the junction between the support rod and the adjustment system. The adjustment system controls vertical movement, facilitating pitch angle adjustment of the support rod and microphone height and angle modification.

In some aspects, a recording system includes a microphone, a recording device, and the backpack microphone stand. The operator uses a backpack mechanism, which works together with the supporting component, to support the support rod. By rotating the adjustment system, the support rod rotates through a transmission mechanism, enabling microphone angle and position adjustments.

The present disclosure has the advantages: by utilizing the support rod and backpack mechanism, the backpack microphone stand distributes weight to the shoulders, back, and chest of the operator, leaving one hand free for movement. The adjustment system allows control over the pitch motion of the support rod with the other hand, thus adjusting the microphone height. This eliminates the need to manually lift the support rod, significantly reducing operator workload and preventing hand fatigue.

BRIEF DESCRIPTION OF THE DRAWINGS

In order to more clearly illustrate the embodiments of the present disclosure or the technical schemes in the prior art, the drawings used in the description of exemplary embodiments will be briefly introduced below. Obviously, the drawings in the following description are only examples of the present disclosure. For those ordinarily skilled in the art, other implementations can be obtained according to the structures shown in these drawings.

REFERENCE NUMERALS

1—support rod; 11—second annular groove; 12—connecting part; 121—clamping portion; 122—bar-shaped groove; 13—locking part; 131—clamping ring; 132—clamping opening; 133—clamping wrench; 14—washer;

2—adjustment system; 21—adjusting rod; 211—disc; 212—first annular groove; 22—transmission mechanism; 211—first connecting portion; 222—second connecting portion; 223—angle; 224—transmission rope; 2241—first rope section; 2242—second rope section; 225—pulley;

3—backpack mechanism; 31—backpacking component; 311—backpack; 312—first gear; 313—fixed plate; 32—angle adjustment component;

4—support component; 41—support rod; 42—support ring; 43—triangular fork; 44—telescopic rod; 45—second gear; 46—support mounting component;

5—microphone mounting component;

6—counterweight bracket; 61—chamber; 62—counterweight; 63—locking ring; and

7—microphone.

The implementation, functional features, and advantages of the present disclosure will be further described with reference to the accompanying drawings in conjunction with exemplary embodiments.

DETAILED DESCRIPTION

In the following, the technical schemes in the embodiments of the present disclosure will be clearly and completely described with reference to the accompanying drawings. Obviously, the described embodiments are only some examples rather than all embodiments of the present disclosure. Based on the embodiments in the present disclosure, all other embodiments obtained by those ordinarily skilled in the art without creative effort shall fall within the scope of the present disclosure.

It should be noted that all directional indications (such as up, down, left, right, front, back, etc.) in the embodiments of the present disclosure are only intended to describe a relative position relationship or a movement situation among components in a certain posture or orientation (as shown in the accompanying drawings). If the certain posture changes, the directional indications will also change accordingly.

In addition, descriptions referring to "first", "second", etc. in the present disclosure are only for descriptive purposes, and are not to be understood as indicating or implying their relative importance or implicitly indicating the number of indicated technical features. Therefore, the features defined as "first" and "second" can explicitly or implicitly include at least one of these features. In addition, "and/or" in the full text includes three schemes, for example, "A and/or B" includes a technical scheme of A, a technical scheme of B, and a technical scheme of both A and B. In addition, the technical schemes of each embodiment can be combined with each other, but they must be based on the implementation by those ordinarily skilled in the art. When the combination of technical schemes is contradictory or impossible, it should be considered that the combination of technical schemes does not exist and is not within the scope of protection claimed by the present disclosure.

Figure 1:
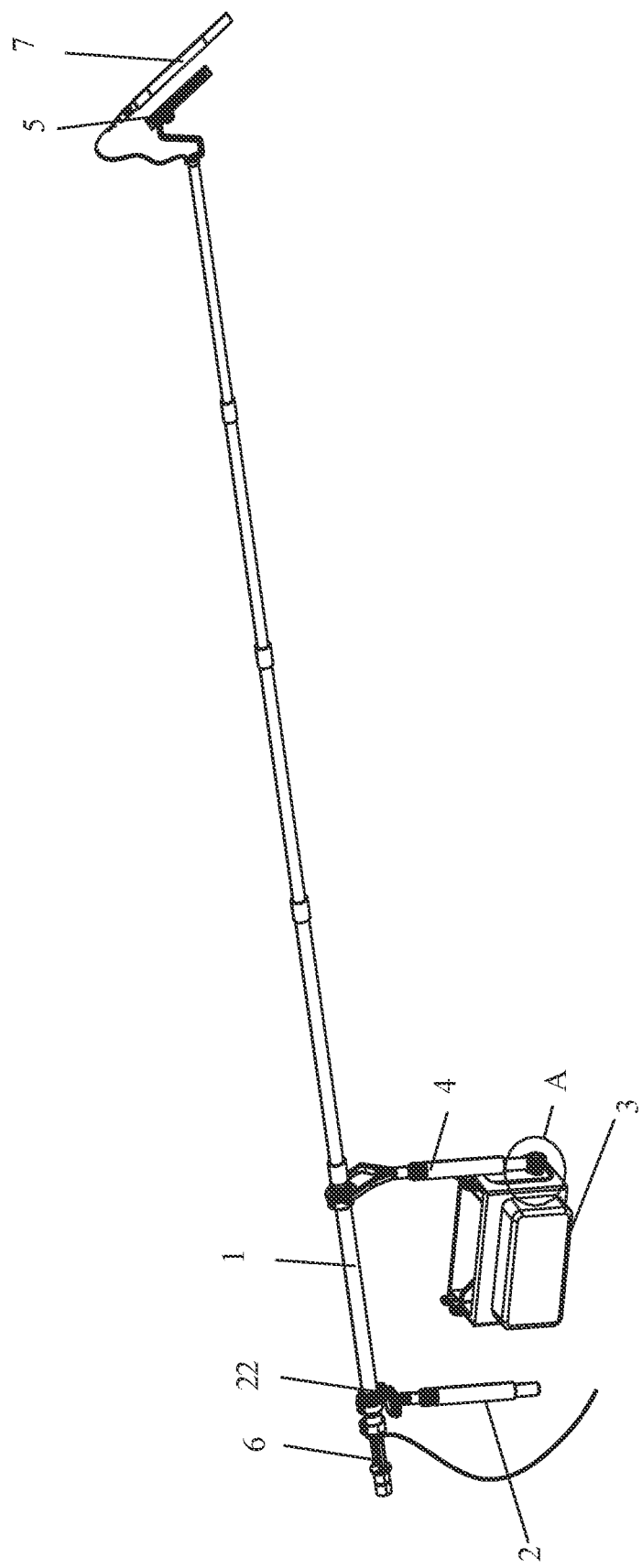
FIG. 1 is a schematic diagram of a backpack microphone stand according to some aspects of the disclosure.

Referring to FIG. 1, an embodiment provides a backpack microphone stand. The backpack microphone stand includes a support rod 1, an adjustment system 2, a backpack mechanism 3, and a support component 4 that supports the support rod 1. The backpack microphone stand provides a mounting position for installing a microphone 7, which can be a conventional microphone for this purpose. The adjustment system 2 provides a hand-held position (i.e., the position held by the user's palm) for the user to hold on to the adjustment system. One end (a first end) of the support component 4 is movably connected to the support rod 1, enabling the support rod 1 to move (e.g., tilt) relative to the support component 4. The other end (a second end) of the support component 4 is movably connected to the backpack mechanism 3, which enables the backpack microphone stand to be carried on the operator's back. By combining the support component 4 and the backpack mechanism 3, when the operator wears the backpack microphone stand, the stand can distribute the weight to the shoulders, back, and chest of the operator, leaving one hand of the operator free for movement. The adjustment system 2 enables control over the pitch motion of the support rod 1 with the other hand, thus adjusting the microphone height. This eliminates the need to manually lift the support rod 1, significantly reducing operator workload and reducing hand fatigue.

Figure 3:
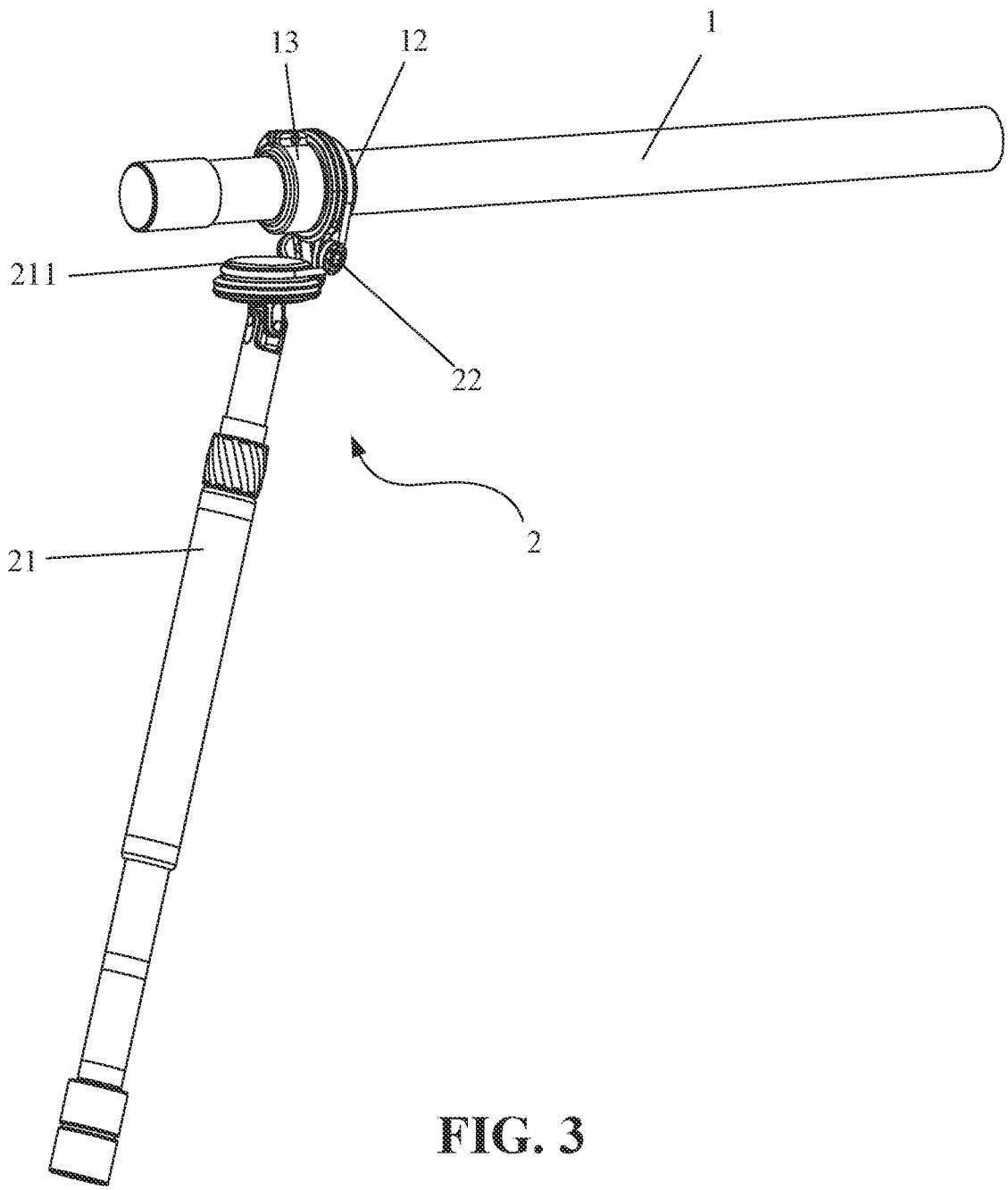
FIG. 3 is a schematic diagram illustrating the connection relationship among the support rod, adjustment rod, and transmission mechanism according to some aspects of the disclosure.

Referring to FIG. 3, the adjustment system 2 in an embodiment includes an adjustment rod 21 and a transmission mechanism 22. One end (first end) of the transmission mechanism 22 is movably connected to the adjustment rod 21, while the other end (second end) is movably connected to the support rod 1. As a result, when the adjustment rod 21 rotates around its axis, the transmission mechanism 22 drives the support rod 1 to rotate around its axis. That is, the transmission mechanism transfers the rotation of the adjustment rod 21 to rotate the support rod 1.

In some aspects, the combination of the support component 4 and the backpack mechanism 3 enables the operator to wear the backpack microphone stand. Moreover, since the support component 4 is rotatably connected to the support rod 1, it does not obstruct the rotation of the support rod 1 during operation. When using the backpack microphone stand, one hand of the operator can move freely, while the other hand only needs to hold the adjustment rod 21. There is no need to manually lift the support rod 1, thereby significantly reducing the operator's workload and preventing hand fatigue.

To adjust the angle of the microphone 7, the operator can rotate the adjusting rod 21, for example, by hand. This rotation of the adjusting rod 21 engages the transmission mechanism 22, which subsequently rotates the support rod 1 around its axis. As a result, the angle and position of the microphone 7 mounted on the support rod 1 can be controlled or adjusted. This feature enables the backpack microphone stand to achieve direction or orientation adjustment of the microphone 7 while minimizing strain on the operator's wrist.

Figure 4:
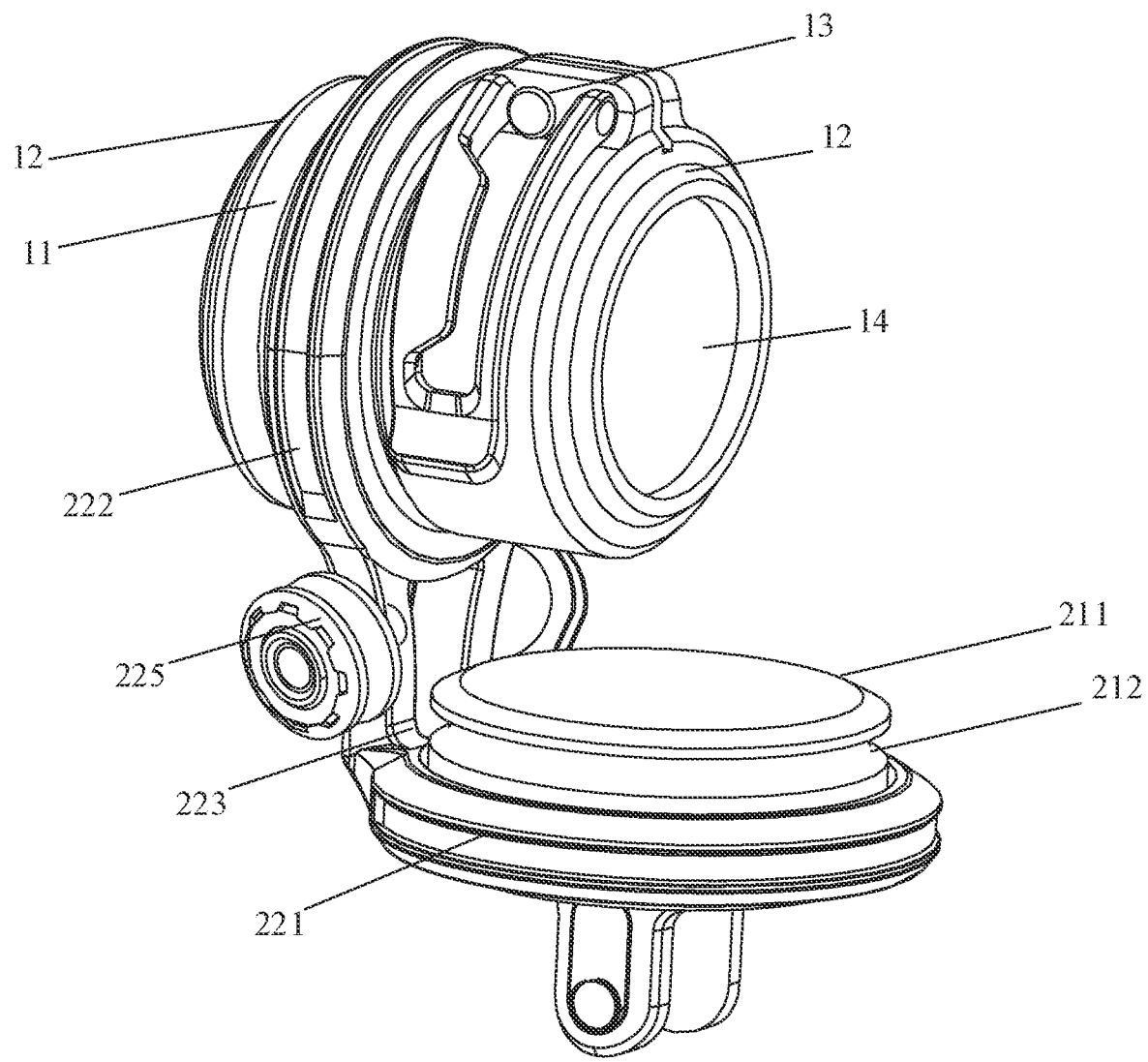
FIG. 4 is a schematic diagram illustrating a first view of the transmission mechanism, first connecting component, and turntable (transmission ropes not shown) according to some aspects of the disclosure.
Figure 5:
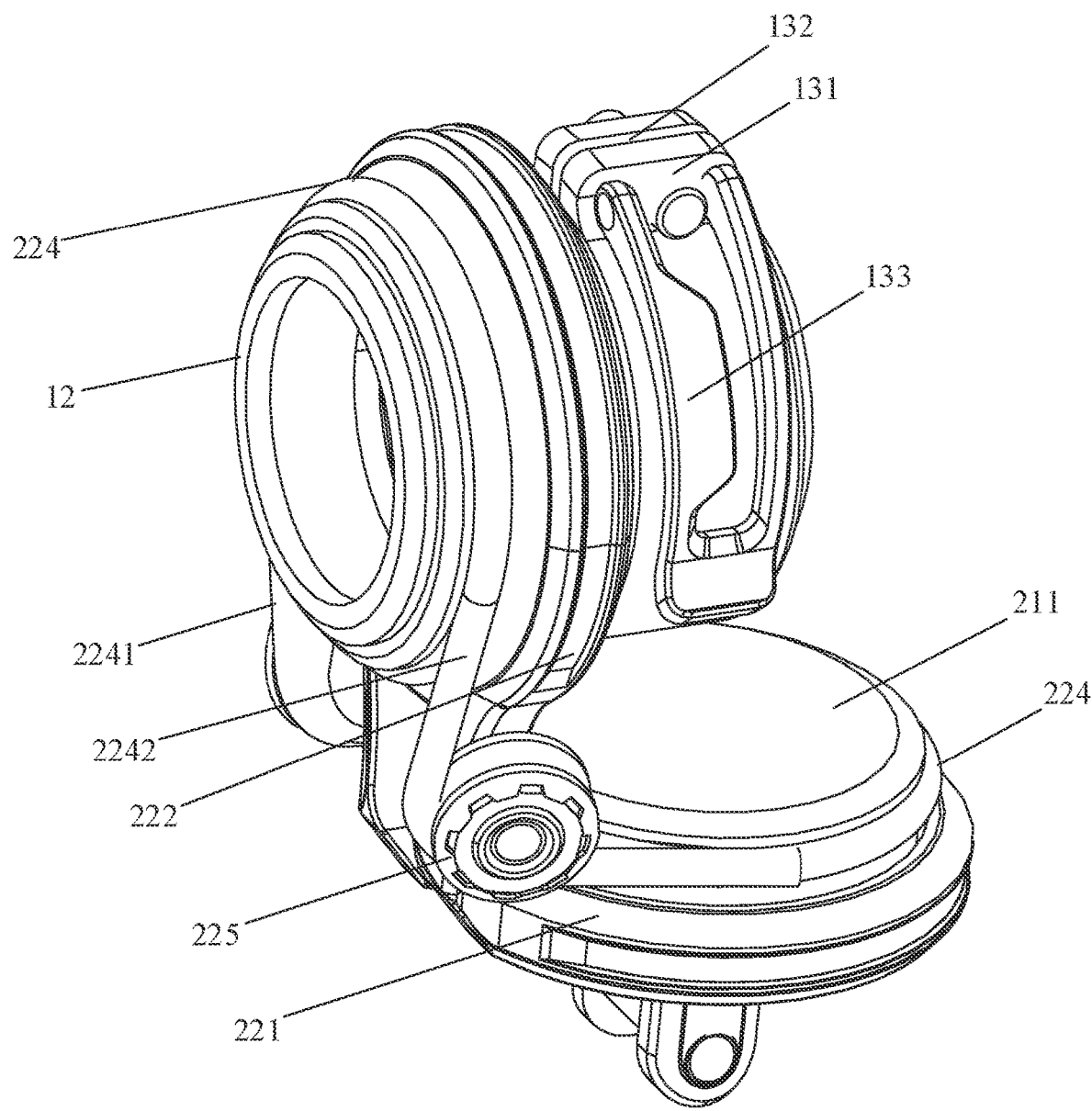
FIG. 5 is a schematic diagram illustrating a second view of the transmission mechanism, first connecting component, and turntable according to some aspects of the disclosure.

Referring to FIGS. 4-5, in an embodiment the transmission mechanism 22 includes a transmission frame and transmission components. The transmission frame includes a first connecting portion 221 and a second connecting portion 222, which are integrally connected, forming an angle 223 at their junction. The first connecting portion 221 can be rotatably and movably connected to the adjustment rod 21, while the second connecting portion 222 can be rotatably and movably connected to the support rod 1. The adjustment rod 21 can be connected to the support rod 1 through the transmission components.

In an embodiment, referring to FIGS. 4-5, both the first connecting portion 221 and the second connecting portion 222 each include annular structures that are rotatably fitted onto the adjustment rod 21 and the support rod 1, respectively.

In an embodiment, referring to FIGS. 4-5, the angle 223 can be set as a right angle, allowing the adjustment rod 21 to be in a vertical state relative to the support rod 1 while the support rod 1 is horizontally positioned. This configuration enhances the convenience of adjusting the adjustment rod 21. In other embodiments, the angle 223 can be set to other desired angles.

In an embodiment, the transmission components includes a transmission rope 224 and multiple pulleys 225 (e.g., two pulleys shown in the drawings). The pulleys 225 are movably arranged on both sides of the first connecting portion 221 or the second connecting portion 222. The ends of the transmission rope 224 can be respectively attached to the support rod 1 and the adjustment rod 21, while both sides of the middle portions of the transmission rope 224 can be supported by the pulleys 225. The pulleys 225 guide the movement of the transmission rope 224 and enable it to rotate without impeding its transmission. In some aspects, when the adjustment rod 21 rotates, one end of the transmission rope 224 attached to it is driven, thereby synchronously rotating the other end of the transmission rope 224, which in turn rotates the support rod 1. This mechanism converts the rotation (e.g., horizontal rotation) of the adjustment rod 21 into the rotation (e.g., axial rotation) of the support rod 1, enabling the adjustment of the microphone 7 direction along with the rotation of the support rod 1. This configuration simplifies and expedites the process of adjusting the microphone 7 direction or orientation, thereby enhancing the efficiency of sound recording.

In some aspects, the transmission rope 224 is set on the support rod 1 and the adjustment rod 21 as follows: the transmission rope 224 includes a first rope section 2241 and a second rope section 2242. One end of the first rope section 2241 is fixedly connected to one end of the second rope section 2242, and the fixed or connected end is attached to the adjustment rod 21. The other end of the first rope section 2241 is fixedly connected to the other end of the second rope section 2242, and the fixed or connected end is attached to the support rod 1. The middle portions of the first rope section 2241 and the second rope section 2242 pass through and are supported by the multiple pulleys 225.

In an embodiment, referring to FIGS. 4-5, the adjustment rod 21 can be equipped with a first annular groove 212, and the support rod 1 can be equipped with a second annular groove 11. One end of the transmission rope 224 can be wrapped around and fitted inside the first annular groove 212 for one or more turns, while the other end of the transmission rope 224 can be wrapped around and fitted inside the second annular groove 11 for one or more turns. The presence of the first annular groove 212 and the second annular groove 11 enhances the stability of the connection between the transmission rope 224 and the adjustment rod 21 and support rod 1. By wrapping the transmission rope 224 one or more times inside the first annular groove 212 on one end and the second annular groove 11 on the other end, the reliability and stability of the transmission rope 224 during transmission is increased.

In an embodiment, the upper end of the adjustment rod 21 can be equipped with a disc 211 or turntable, which is movably connected to the upper end of the adjustment rod 21 through a universal joint. The first connecting portion 221 is rotatably fitted outside the disc 211, and one end of the first rope section 2241 and one end of the second rope section 2242 are fixedly attached to the disc 211. A bearing can be positioned between the first connecting portion 221 and the disc 211. The first annular groove 212 is located on the outer side of the disc 211, above the connection between the first connecting portion 221 and the disc 211. One end of the first rope section 2241 and one end of the second rope section 2242 are fixedly fitted inside the first annular groove 212. The universal joint facilitates controlling the relative angle between the adjustment rod 21 and the support rod 1, providing convenience and control over the adjustment rod 21. For instance, when the support rod 1 tilts upward during use, the adjustment rod 21 can stay in a vertical state.

In an embodiment, the backpack microphone stand can be further equipped with a first connecting component including a connecting part 12 and a locking part 13. The connecting part 12 can be movably fitted onto the support rod 1, while the locking part 13 is connected to the connecting part 12 to secure its attachment to the support rod 1. The first connecting portion 222 is rotatably fitted outside the connecting part 12, and the fixing point between the other end of the first rope section 2241 and the other end of the second rope section 2242 can be attached to the connecting part 12. In some aspects, a bearing can be positioned between the first connecting portion 222 and the connecting part 12. The second annular groove 11 is located on the outer side of the connecting part 12, and the fixing point between one end of the first rope section 2241 and the other end of the second rope section 2242 are fitted inside the second annular groove 11. The connection between the first connecting portion 222 and the connecting part 12 is situated between the second annular groove 11 and the locking part 13. In some aspects, the connecting part 12 is locked and secured on the support rod 1 by the locking part 13. By controlling the rotation of the adjustment rod 21, the adjustment rod 21 drives the connecting part 12 to rotate through the transmission rope 224, thereby rotating the support rod 1 and converting the rotation (e.g., horizontal rotation) of the adjustment rod 21 into the rotation (e.g., axial rotation) of the support rod 1. This facilitates easy control over the microphone direction and enhances the audio recording process.

Figure 6:
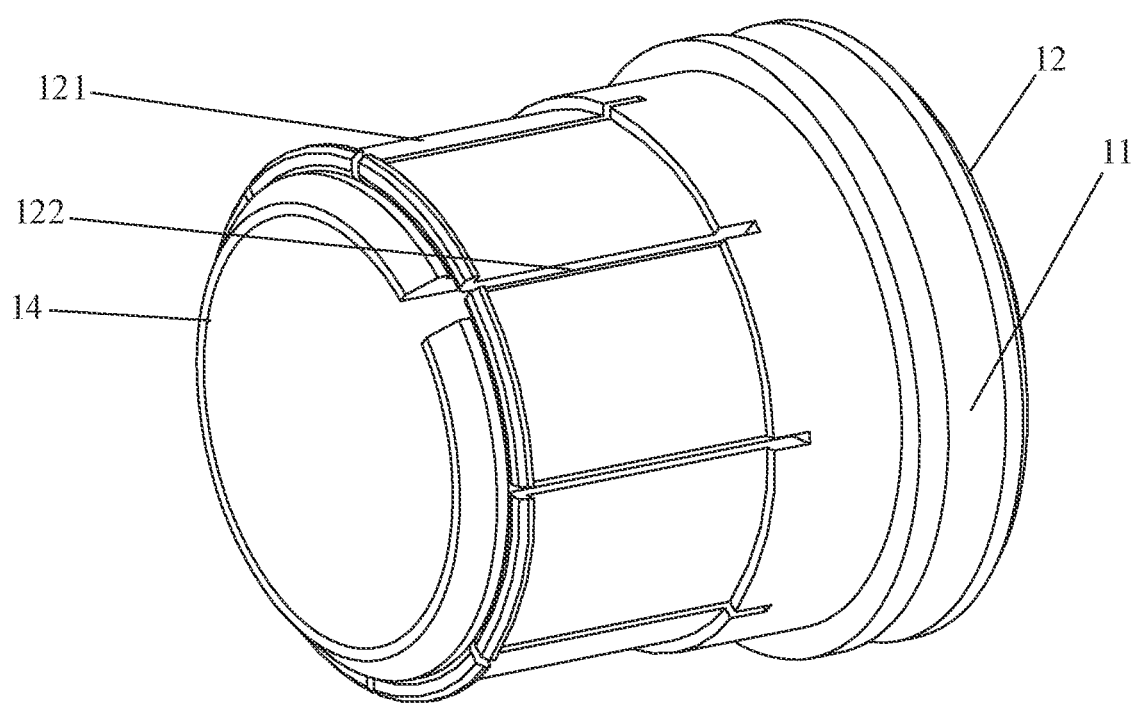
FIG. 6 is a schematic diagram of a connecting part and a washer according to some aspects of the disclosure.

In an embodiment, referring to FIGS. 4-6, one end of the connecting part 12 is equipped with a clamping portion 121, and multiple bar-shaped grooves 122 (or slots) that allow deformation of the clamping portion 121 are provided on the clamping portion 121. The bar-shaped grooves 122 extend through the inner and outer surfaces of the clamping portion 121 and reach the other end of the clamping portion 121. The locking part 13 includes a clamping ring 131, and a clamping opening 132 is present on the clamping ring 131. A clamping wrench 133 (or handle), which can adjust the degree of opening and closing of the clamping opening 132, is movably positioned at or near the clamping opening 132. The clamping ring 131 can be fitted onto the clamping portion 121 to clamp it onto the support rod 1. By adjusting the degree of opening and closing of the clamping opening 132 using the movable clamping wrench 133, the clamping ring 131 can be controlled to clamp on the clamping portion 121. The bar-shaped grooves 122 enable the other end of the clamping portion 121 to deform when clamped or compressed by the clamping ring 131, ensuring a secure lock onto the support rod 1.

In an embodiment, referring to FIG. 6, the support rod 1 can be equipped with a washer 14 that corresponds to the clamping portion 121, and the clamping portion 121 can be fitted against the outer side of the washer 14. The inclusion of the washer 14 prevents or reduce wear between the connecting part 12 and the support rod 1, increases the frictional force between the support rod 1 and the connecting part 12, and facilitates stable rotation of the support rod 1 when the connecting part 12 is rotating. In some aspects, the washer 14 can be an open washer to accommodate support rods of different sizes. Different sizes of washers can also be provided to accommodate support rods with various diameters.

Figure 7:
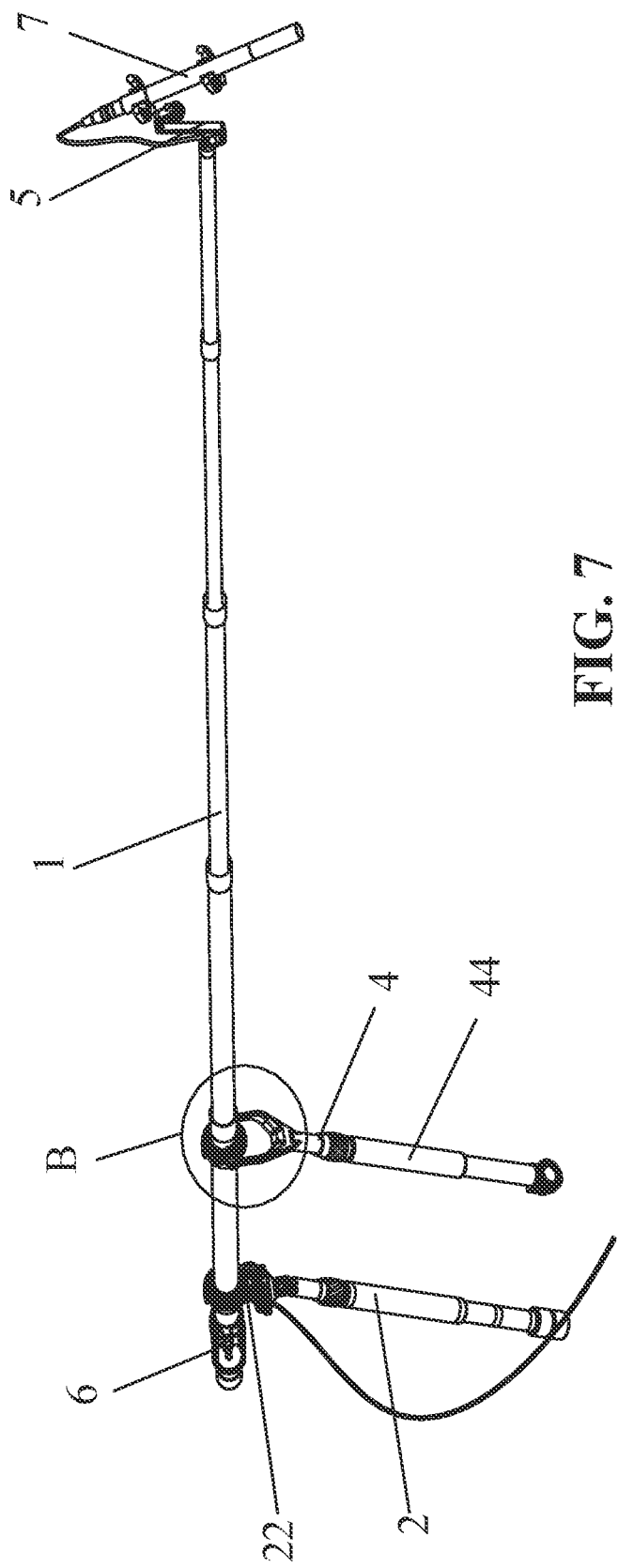
FIG. 7 is a schematic diagram of the backpack microphone stand of FIG. 1 in a first perspective view without showing the backpack mechanism according to some aspects of the disclosure.
Figure 8:
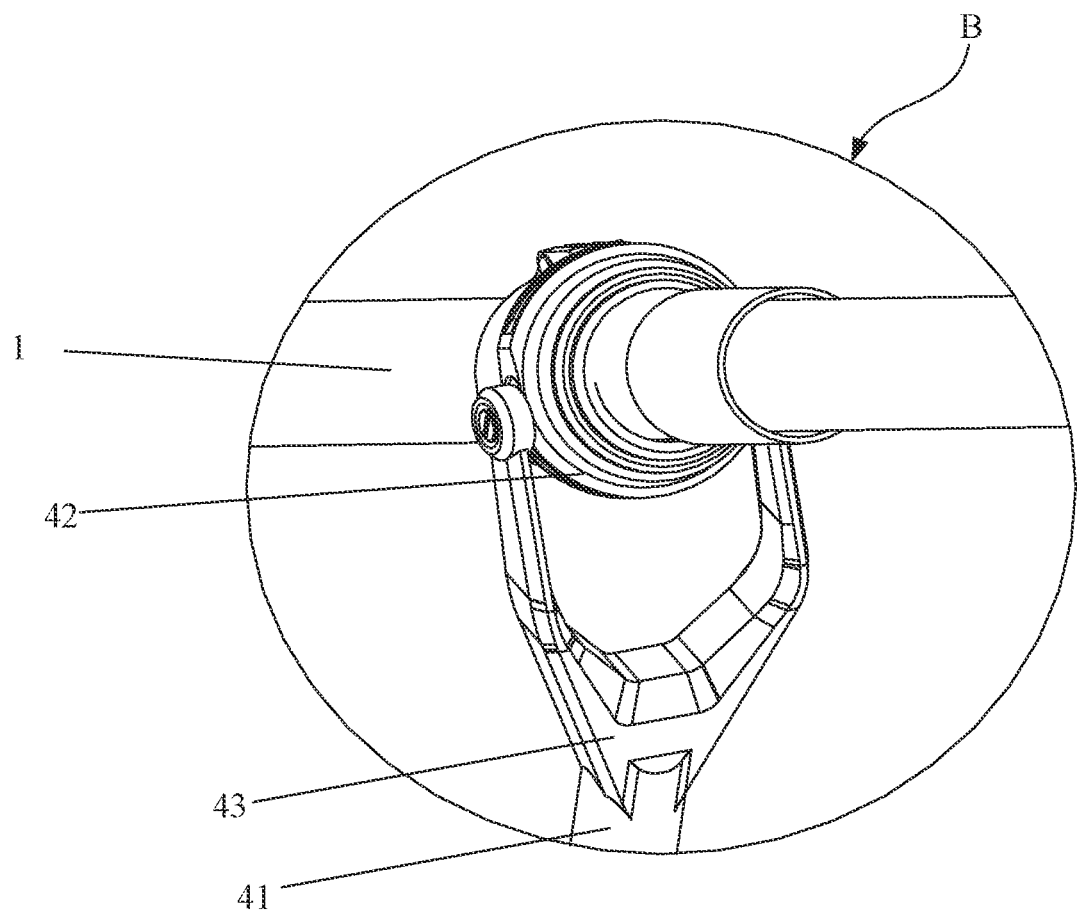
FIG. 8 is an enlarged view of area B in FIG. 7 according to some aspects of the disclosure.

In an embodiment, referring to FIGS. 7-8, the support component 4 includes a support rod 41 and a support ring 42. The support rod 1 can be rotatably positioned within the support ring 42. One end of the support rod 41 can be movably connected to the support ring 42, while the other end can be movably connected to the backpack mechanism 3 (see FIG. 2). In an embodiment, the backpack mechanism 3 can include shoulder straps or a backpack, which can be movably connected to the bottom or lower end of the support rod 41. This enables for adjustment of the inclination of the support rod 41 to accommodate operators of different body sizes. For instance, when individuals of varying body sizes wear the backpack mechanism 3, the support rod 41 may assume different inclinations. Since the backpack mechanism 3 can be movably connected to the bottom of the support rod 41, the inclination of the support rod 41 can be adjusted to achieve a vertical position or any desired position, facilitating the audio recording process.

In some aspects, the support rod 41 and the support ring 42 can be indirectly and movably connected or directly and movably connected. When indirectly and movably connected, one end of the support rod 41 can be affixed with a triangular fork 43, and the other two ends of the triangular fork 43 are hinged to both sides of the support ring 42.

In an embodiment, the backpack microphone stand includes a second connecting component that is fitted onto the support rod 1, allowing the support component to be movably attached to it. Specifically, the structure of the second connecting component can be essentially the same as that of the first connecting component, and the annular groove may not be present on the second connecting component.

In an embodiment, the support rod 41 can be an extendable telescopic rod 44, which includes multiple interconnected rod bodies. Rotating any two rod bodies enables extension or contraction of the telescopic rod. The telescopic rod 44 offers the advantage of adjusting the length of the support rod 41 as needed, providing enhanced convenience during use.

Figure 2:
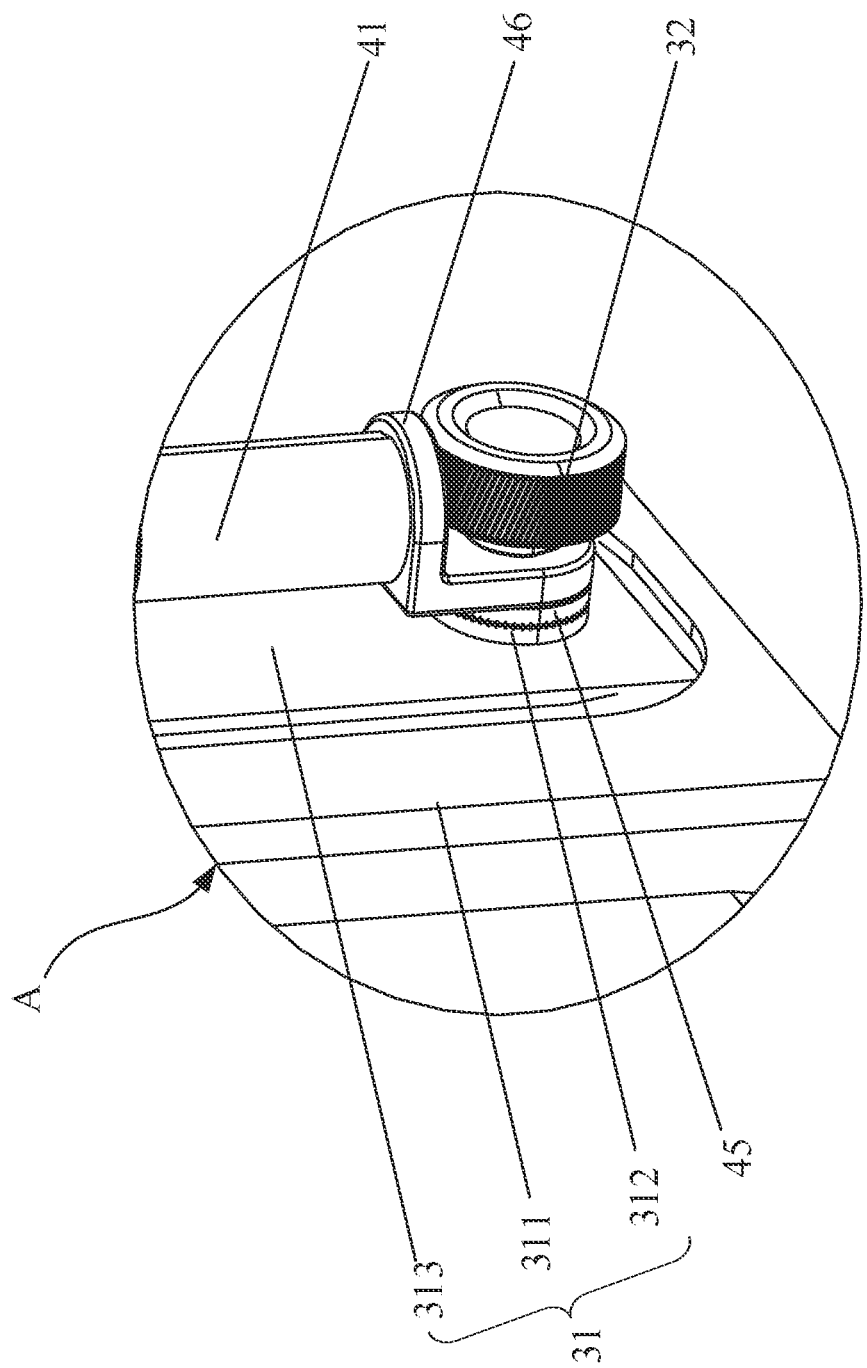
FIG. 2 is an enlarged view of area A in FIG. 1 according to some aspects of the disclosure.

In an embodiment, referring to FIG. 2, the backpack mechanism 3 includes a backpack component 31 and an angle adjustment component 32. The angle adjustment component 32 (angle adjustment part) can be threaded onto the support rod 41 and the backpack component 31 in sequence, securing the support rod 41 onto the backpack component 31.

In some aspects, the backpack component 31 includes a backpack 311 and a first gear 312 (a first toothed disc) fixed to the former. On the end of the support rod 41 far away from the support ring 42, a second gear 45 (a second toothed disc) is provided. The angle adjustment component can be threaded onto the first gear 312 and the second gear 45, enabling them to engage. In an embodiment, when angle adjustment is required, the angle adjustment component 32 can be rotated to loosen the engagement between the first gear 312 and the second gear 45. This allows the support rod 41 to rotate relative to the backpack 311, facilitating adjustment of the support rod's inclination angle. Once the desired angle is achieved, the angle adjustment component 32 is reversed to tighten the engagement between the first gear 312 and the second gear 45, ensuring a secure connection.

In an embodiment, referring to FIG. 2 and FIGS. 7-8, the other end of the support rod 41 can be equipped with a support mounting component 46, which includes a second gear 45 on one side. The backpack 311 has a fixed plate 313 on its side, with the first gear 312 fixed to it. The second gear 45 engages with the first gear 312, and the angle adjustment component 32 passes through the support mounting component 45, the second gear 45, and the first gear 312 in order, connecting them through threads.

To adjust the inclination angle between the support rod 41 and the backpack 311, the angle adjustment component 32 is loosened, allowing the second gear 45 to rotate relative to the first gear 312. Subsequently, the angle adjustment component 32 is tightened. For instance, when individuals of varying body sizes wear the backpack 311, it may result in different inclinations. Thus, by adjusting the rotation angle of the second gear 45 and the first gear 312, the inclination of the support rod 41 can be further adjusted to ensure optimal audio recording to accommodate operators of different body sizes.

In an embodiment, referring to FIGS. 1 and 9-11, one end of the support rod 1 can be fixedly equipped with a microphone mounting component 5, which provides a mounting position. The other end of the support rod 1 features a counterweight bracket 6 to increase the counterweight. The counterweight bracket 6, the adjustment system 2, the support rod 4/41, and the microphone mounting component 5 are arranged in sequence along the support rod 1. This arrangement ensures a more balanced support structure and enhances the convenience of use.

Figure 9:
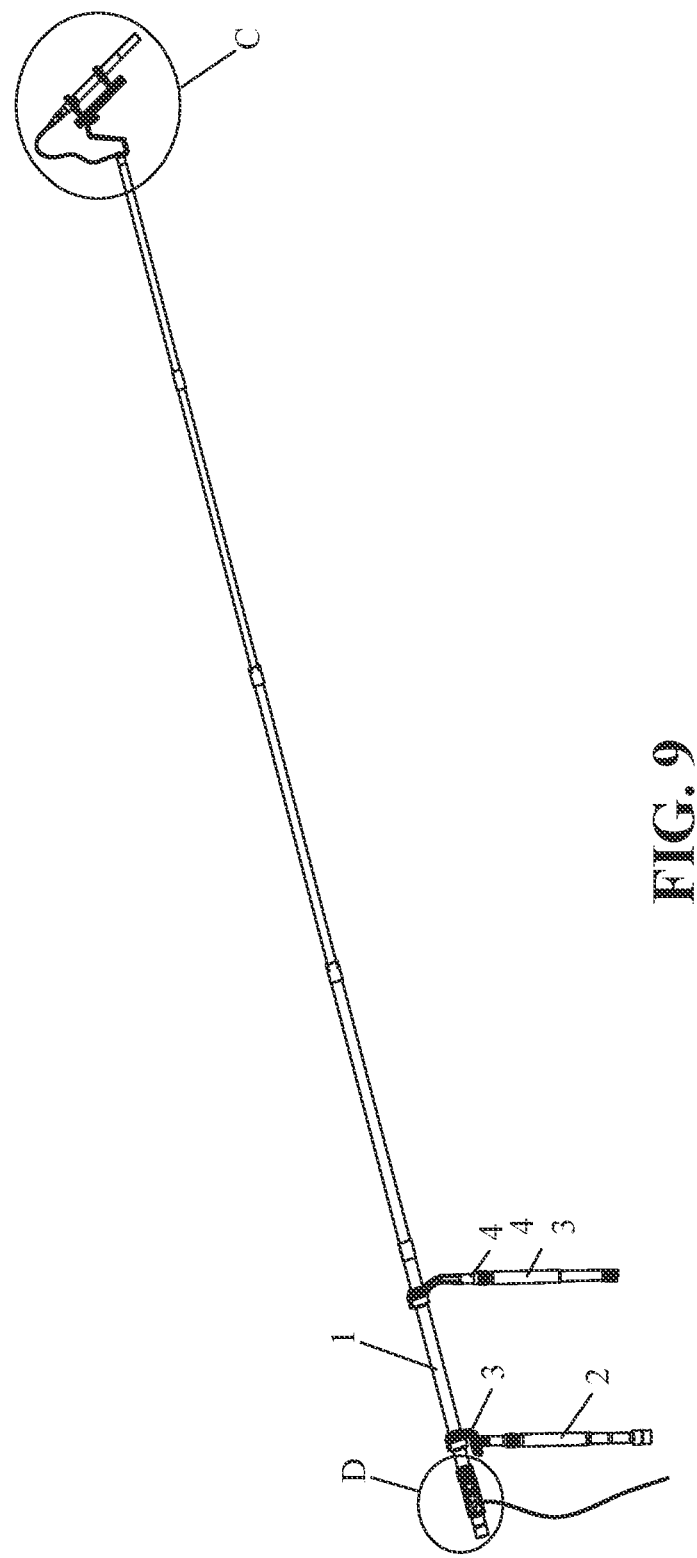
FIG. 9 is a schematic diagram of the backpack microphone stand of FIG. 1 in a second perspective view without showing the backpack mechanism according to some aspects of the disclosure.
Figure 10:
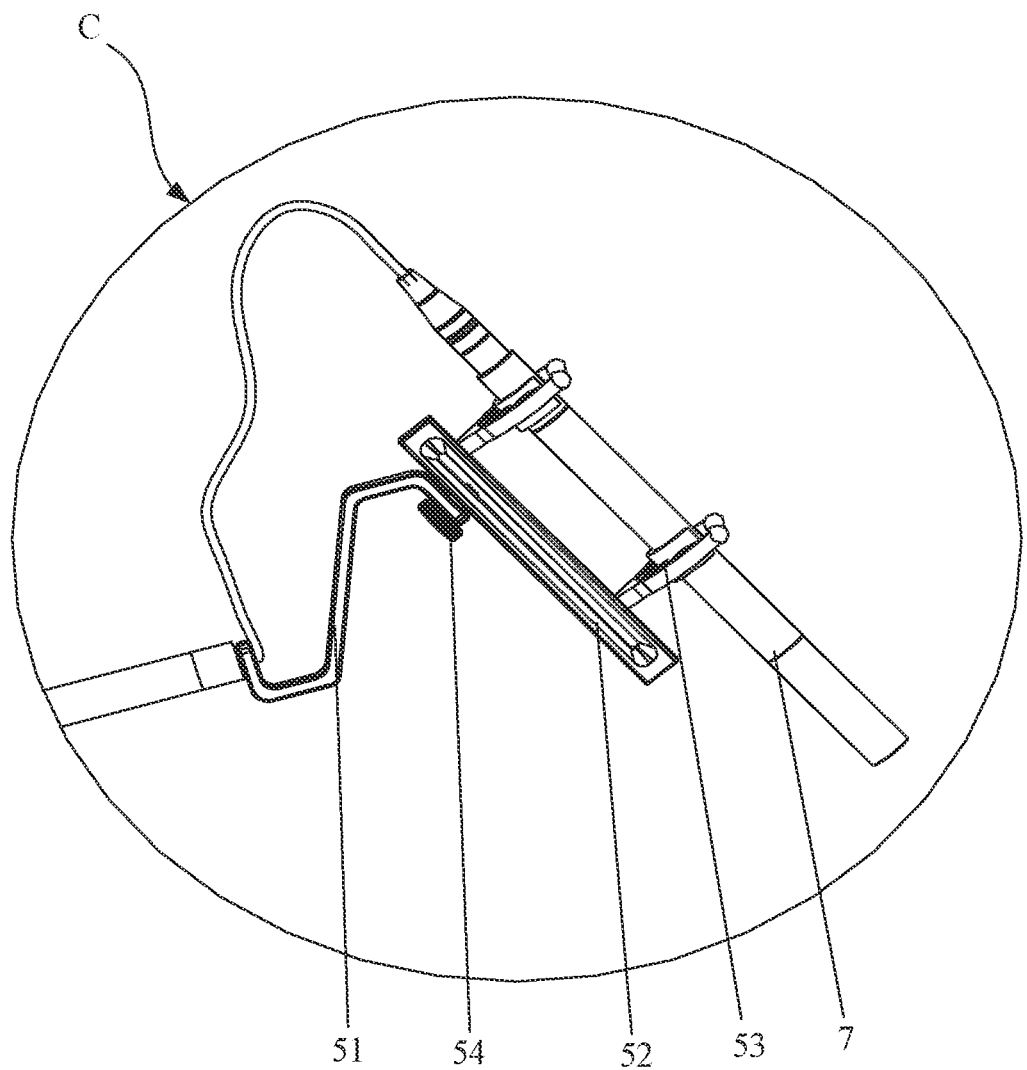
FIG. 10 is an enlarged view of area C in FIG. 9 according to some aspects of the disclosure.

In an embodiment, referring to FIGS. 9-10, the microphone mounting component 5 includes a mounting frame 51, an adjustment frame 52, and a support clamp 53. The mounting frame 51 is fixedly attached to one end of the support rod 1, while the adjustment frame 52 is slidably and movably mounted at the other end of the mounting frame 51. The other end of the mounting frame 51 may have a screw 54 to secure the adjustment frame 52 in place. The support clamp 53, which provides the mounting position, is fixedly mounted on the adjustment frame 52. For example, two support clamps 53 are present on the adjustment frame 52, both providing mounting positions.

Figure 11:
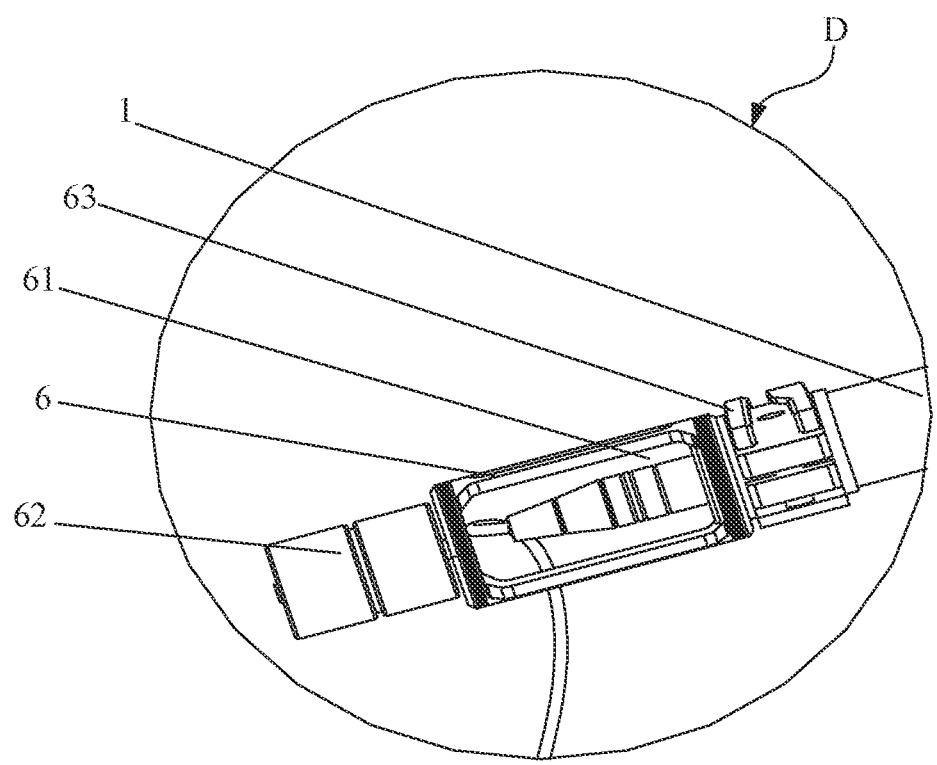
FIG. 11 is an enlarged view of area D in FIG. 9 according to some aspects of the disclosure.

In an embodiment, referring to FIG. 11, a chamber 61 is provided on the interface of a counterweight bracket 6, corresponding to the other end of the support rod 1. A counterweight 62 is mounted on the counterweight bracket 6.

In an embodiment, the counterweight bracket 6 can be detachably secured to the other end of the support rod 1 using a locking ring 63.

In an embodiment, interfaces can be present at both ends of the support rod 1, allowing electrical connection between them through the interior of the support rod. Communication lines for the interfaces are set inside the support rod. The interface of the support rod 1 corresponding to the end of the counterweight bracket serves as an audio interface for connecting an external recording device. The interface at the other end of the support rod 1, corresponding to the mounting position, serves as an interface for connecting an external microphone 7.

Furthermore, this embodiment provides a recording structure, which includes a microphone 7 detachably secured to the mounting position, a microphone support, and a recording device electrically connected to the microphone 7. The recording device can be a camera with recording functionality or any existing recording device.

The above are only the exemplary embodiments of the present disclosure and are not intended to limit the present disclosure. Any modification, equivalent substitution and improvement made within the spirit and principle of the present disclosure should fall within the protection scope of the present disclosure.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, processes, operations, elements, and/or components, but do not preclude the presence or addition of one or more other features, integers, processes, operations, elements, components, and/or groups thereof.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A backpack microphone stand, comprising:
   a first support rod;
   an adjustment system connected to the first support rod, wherein the adjustment system comprises: an adjustment rod; and a transmission mechanism, a first end of the transmission mechanism being movably connected with the adjustment rod and a second end of the transmission mechanism being movably connected with the first support rod, such that when the adjustment rod rotates around a first axis, the first support rod is driven around a second axis by the transmission mechanism;
   a backpack mechanism; and
   a support component for the first support rod, wherein the first support rod is provided with a mounting position for a microphone, a first end of the support component is movably connected with the first support rod, and a second end of the support component is movably connected with the backpack mechanism.

2. The backpack microphone stand according to claim 1, wherein the support component comprises:
   a second support rod; and
   a support ring,
   wherein the first support rod is rotatably arranged in the support ring, and a first end of the second support rod is movably connected with the support ring, and a second end of the second support rod is movably connected with the backpack mechanism.

3. The backpack microphone stand according to claim 2, wherein the backpack mechanism comprises:
   a backpack component; and
   an angle adjustment part,
   wherein the angle adjustment part penetrates through the second support rod and the backpack component to lock the backpack component to the second support rod.

4. The backpack microphone stand according to claim 3, wherein the backpack component comprises:
   a backpack; and
   a first toothed disc,
   the first toothed disc being fixed to the backpack, a second toothed disc being arranged at one end of the second support rod away from the support ring, and the angle adjustment part penetrating through the first toothed disc and the second toothed disc to mesh the first toothed disc and the second toothed disc together.

5. The backpack microphone stand according to claim 1, wherein the transmission mechanism comprises:
   a transmission stand body comprising a first connecting portion and a second connecting portion, the first connecting portion being connected with the second connecting portion, and an angle being formed at a joint of the first connecting portion and the second connecting portion, the first connecting portion being rotatably sleeved on the adjustment rod, the second connecting portion being rotatably sleeved on the first support rod; and
   a transmission assembly, the adjustment rod being in transmission connection with the first support rod through the transmission assembly.

6. The backpack microphone stand according to claim 5, wherein the transmission assembly comprises:
   a transmission rope; and
   a plurality of pulleys movably arranged on respective sides of the first connecting portion or the second connecting portion,
   two ends of the transmission rope being sleeved on the first support rod and the adjustment rod respectively, and two sides of a middle part of the transmission rope being sleeved on the plurality of pulleys respectively.

7. The backpack microphone stand according to claim 6, wherein:
   the adjustment rod is provided with a first annular groove, and the first support rod is provided with a second annular groove; and
   a first end of the transmission rope is sleeved and wound one or more times in the first annular groove; a second end of the transmission rope is sleeved and wound one or more times in the second annular groove.

8. The backpack microphone stand according to claim 1, further comprising:
   a microphone mounting assembly fixedly arranged at a first end of the first support rod, the microphone mounting assembly configured to provide a mounting position for the microphone; and
   a counterweight bracket at a second end of the first support rod, the counterweight bracket, the adjustment system, the support component, and the microphone mounting assembly being arranged sequentially on the first support rod.

9. The backpack microphone stand according to claim 1, wherein the first axis corresponds to an axis of the adjustment rod, and the second axis corresponds to an axis of the first support rod.

10. A recording structure comprising a microphone, a recording device, and the backpack microphone stand according to claim 1, the microphone being arranged at a mounting position of the backpack microphone stand, and the recording device being electrically connected with the microphone through the backpack microphone stand.

* * * * *